(12) United States Patent
Wang

(10) Patent No.: US 11,210,417 B2
(45) Date of Patent: Dec. 28, 2021

(54) IDENTITY RECOGNITION METHOD AND DEVICE

(71) Applicant: ADVANCED NEW TECHNOLOGIES CO., LTD., Grand Cayman (KY)

(72) Inventor: Jialei Wang, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 93 days.

(21) Appl. No.: 16/363,365

(22) Filed: Mar. 25, 2019

(65) Prior Publication Data

US 2019/0220622 A1     Jul. 18, 2019

Related U.S. Application Data

(63) Continuation of application No. PCT/CN2017/102213, filed on Sep. 19, 2017.

(30) Foreign Application Priority Data

Sep. 26, 2016   (CN) .......................... 201610851175.2

(51) Int. Cl.
*G06F 12/14* (2006.01)
*G06F 21/62* (2013.01)
(Continued)

(52) U.S. Cl.
CPC ...... *G06F 21/6245* (2013.01); *G06F 16/2365* (2019.01); *G06F 16/90344* (2019.01); *G06F 21/64* (2013.01); *H04L 63/0876* (2013.01)

(58) Field of Classification Search
CPC .......... G06F 21/6245; G06F 16/90344; G06F 16/2365; G06F 21/64; H04L 63/0876; H04L 63/08716
(Continued)

(56) References Cited

U.S. PATENT DOCUMENTS 7,458,508 B1 * 12/2008 Shao ...................... G06Q 20/04
                                                                235/380
7,549,577 B2    6/2009 Davis
(Continued)

FOREIGN PATENT DOCUMENTS

CN      1930901 A     3/2007
CN    102413169 A     4/2012
(Continued)

OTHER PUBLICATIONS

Dai et al, Privacy-Preserving Assessment of Social Network Data Trustworthiness, 2012, IEEE, pp. 97-106.*
(Continued)

*Primary Examiner* — Luu T Pham
*Assistant Examiner* — Jenise E Jackson

(57) ABSTRACT

The present specification provides an identity recognition method and device. The method comprises: collecting data of address books, each address book comprising multiple identity information pairs of multiple users, and each identity information pair comprising a name and a mobile phone number; searching for an identity information pair to be recognized in the data of address books, the identity information pair to be recognized comprising a name and a mobile phone number of a user to be recognized; and in response to that the searching result satisfies a risk condition, determining that the user to be recognized has a risk.

6 Claims, 3 Drawing Sheets

(51) Int. Cl.
*G06F 16/903* (2019.01)
*H04L 29/06* (2006.01)
*G06F 16/23* (2019.01)
*G06F 21/64* (2013.01)

(58) Field of Classification Search
USPC ............................................. 726/22
See application file for complete search history.

(56) References Cited

U.S. PATENT DOCUMENTS

| | | | |
|---|---|---|---|
| 7,617,970 | B2 | 11/2009 | Carr et al. |
| 7,686,214 | B1 | 3/2010 | Shao et al. |
| 7,801,828 | B2* | 9/2010 | Candella ............... G06Q 20/40 705/76 |
| 8,386,377 | B1* | 2/2013 | Xiong ................... G06Q 20/04 705/38 |
| 8,626,137 | B1* | 1/2014 | Devitt ................. H04M 3/4931 455/415 |
| 8,630,513 | B2 | 1/2014 | Gokturk et al. |
| 8,831,972 | B2 | 9/2014 | Angell et al. |
| 8,880,608 | B1* | 11/2014 | Gyongyi ................ G06Q 50/01 709/204 |
| 8,918,904 | B2 | 12/2014 | Sanin et al. |
| 8,935,263 | B1 | 1/2015 | Rodriguez et al. |
| 9,406,032 | B2 | 8/2016 | Salonen |
| 9,646,261 | B2 | 5/2017 | Agrafioti et al. |
| 9,729,537 | B2 | 8/2017 | Mcbride et al. |
| 9,906,642 | B2 | 2/2018 | Jing |
| 10,083,236 | B2* | 9/2018 | Crosby ................ G06F 16/951 |
| 10,742,591 | B2* | 8/2020 | Nguyen ............. H04L 63/1441 |
| 2005/0071465 | A1 | 3/2005 | Zeng et al. |
| 2006/0149674 | A1 | 7/2006 | Cook et al. |
| 2007/0162761 | A1 | 7/2007 | Davis et al. |
| 2007/0263853 | A1 | 11/2007 | Pearson et al. |
| 2007/0280445 | A1 | 12/2007 | Shkedi |
| 2009/0265432 | A1 | 10/2009 | Suehiro |
| 2010/0161807 | A1 | 6/2010 | Mostafa |
| 2012/0109802 | A1 | 5/2012 | Griffin et al. |
| 2012/0117036 | A1* | 5/2012 | Lester ................... G06Q 10/109 707/692 |
| 2012/0117163 | A1* | 5/2012 | Lester ................... G06Q 10/109 709/206 |
| 2012/0123959 | A1 | 5/2012 | Davis et al. |
| 2012/0226701 | A1 | 9/2012 | Singh |
| 2013/0218902 | A1* | 8/2013 | Vendrow ............. G06F 16/9535 707/748 |
| 2014/0066044 | A1* | 3/2014 | Ramnani ................. H04W 8/24 455/418 |
| 2014/0099930 | A1 | 4/2014 | Yu et al. |
| 2014/0164317 | A1* | 6/2014 | Lynch ................... G06Q 10/10 707/609 |
| 2014/0237570 | A1* | 8/2014 | Shishkov ............. G06F 21/316 726/7 |
| 2014/0365509 | A1* | 12/2014 | Lester ................. G06F 16/2365 707/748 |
| 2015/0073937 | A1* | 3/2015 | Lester ................... G06Q 30/02 705/26.35 |
| 2016/0055205 | A1 | 2/2016 | Jonathan et al. |
| 2016/0098644 | A1 | 4/2016 | Hua et al. |
| 2016/0203320 | A1* | 7/2016 | Valceanu ............... H04W 12/10 726/25 |
| 2017/0163797 | A1 | 6/2017 | Jing |
| 2020/0125552 | A1* | 4/2020 | Lester .................. G06Q 10/109 |

FOREIGN PATENT DOCUMENTS

| | | |
|---|---|---|
| CN | 101068156 B | 11/2012 |
| CN | 103220391 A | 7/2013 |
| CN | 103841123 A | 6/2014 |
| CN | 104598498 A | 5/2015 |
| CN | 104935438 A | 9/2015 |
| CN | 105306657 A | 2/2016 |
| CN | 105657130 A | 6/2016 |
| CN | 105678129 A | 6/2016 |
| CN | 106790915 A | 5/2017 |
| CN | 106791229 A | 5/2017 |
| CN | 107026831 A | 8/2017 |
| JP | 2009-176314 A | 8/2009 |
| RU | 2467386 C2 | 11/2012 |
| TW | 201537940 A | 10/2015 |
| WO | 33094562 A1 | 11/2003 |
| WO | 2007/026810 A1 | 3/2007 |

OTHER PUBLICATIONS

Costache et al, Personalizing Page Rank-Based Ranking over Distributed Collections, Jun. 2007, Research Gate, pp. 1-15.*
Quercia et al, Using Mobile Phones to Nurture Social Networks, Apr. 8, 2010, IEEE, pp. 12-20. (Year: 2010).*
Feng et al, A Social Network Service Solution Based on Mobile Subscriber Contact Books, Jun. 2010, IEEE, pp. 53-66. (Year: 2010).*
Wey et al, A New Personal Number Service Realized by Mobile Communication System, May 18, 2000, IEEE, pp. 1527-1531. (Year: 2000).*
First Examination Report for Australian Application No. 2017329507 dated Nov. 20, 2019 (3 pages).
Office Action for Japanese Application No. 2019-516464 dated Apr. 14, 2020.
Office Action for Canadian Application No. 3038029 dated Apr. 20, 2020.
Second Examination Report for Australian Application No. 2017329507 dated Jun. 2, 2020.
Written Opinion of the International Searching Authority and International Search Report for PCT Application No. PCT/CN2017/102213 dated Sep. 26, 2016 (16 pages).
International Preliminary Report on Patentability Chapter I for PCT Application No. PCT/CN2017/102213 dated Apr. 4, 2019 (14 pages).
Office Action for Taiwanese Application No. 106124169 dated Jan. 8, 2019 (10 pages).
First Search for Chinese Application No. 201610851175.2 dated Aug. 24, 2019 (1 page).
First Office Action for Chinese Application No. 201610851175.2 dated Sep. 3, 2019 with English machine translation (12 pages).
Search Report for European Application No. 17852347.8 dated Mar. 30, 2020.
Office Action and Search Report for Russian Application No. 2019112743 dated Jan. 27, 2020.
Office Action for Korean Application No. 10-2019-7010938 dated Jun. 22, 2020.

* cited by examiner

IDENTITY RECOGNITION METHOD AND DEVICE

CROSS-REFERENCE TO RELATED APPLICATIONS

This application is a continuation application of International Patent Application No. PCT/CN2017/102213, filed on Sep. 19, 2017, which is based on and claims priority to the Chinese Patent Application No. 201610851175.2, filed on Sep. 26, 2016 and entitled "Identity Recognition Method and Device." The above-referenced applications are incorporated herein by reference in their entirety.

TECHNICAL FIELD

The present disclosure relates to network technologies, and in particular, to an identity recognition method and device.

BACKGROUND

Real-name registration is often requested for access to Internet. Real-name authentication is therefore needed in many Internet scenarios, in particular, in services such as finance and e-commerce. To hide their true identities, swindlers who cheat and conduct fraudulence often obtain a lot of other people's identity information through leakage of information on the Internet or through volume purchase, assume the other people's ID numbers and names, and use obtained mobile phone numbers for account registration and authentication on Internet, committing fraudulence in credit applications such as credit card or loan applications, thereby causing losses of service providers and financial institutions.

In existing identity authentication manners, fraudulence is recognized mainly on a network layer or device layer. For example, identity theft may be recognized by using a recognition model based on the IP address, MAC address, or device identifier like IMEI, of the device used by the person who steals the identity. However, many of the swindlers are professional hackers who have strong network skills and can bypass the existing identity recognition models through some strategies and make it difficult to recognize identities.

SUMMARY

The present disclosure provides an identity recognition method, device, and a non-transitory computer-readable storage medium to achieve detection of identity fraud.

According to one aspect, the identity recognition method may comprise: collecting data of address books, each address book comprising multiple identity information pairs of multiple users, and each identity information pair comprising a name and a mobile phone number; searching for an identity information pair to be recognized in the data of address books, the identity information pair to be recognized comprising a name and a mobile phone number of a user to be recognized; and in response to that the searching result satisfies a risk condition, determining that the user to be recognized has a risk.

In some embodiments, the method may further comprise: determining a weight corresponding to each identity information pair, the weight indicating a degree of credibility of the identity information pair.

In other embodiments, the determining a weight corresponding to each identity information pair may comprise: determining a weight corresponding to each identity information pair based on the number of address books comprising the identity information pair.

In still other embodiments, the determining a weight corresponding to each identity information pair may comprise: calculating a pagerank value of each identity information pair using a pagerank method, and using the pagerank value as the weight of the identity information pair.

In yet other embodiments, the calculating a pagerank value of each identity information pair may comprise: determining one or more links connecting each identity information pair with other identity information pairs based on the data of address books; and calculating the pagerank value of the each identity information pair based on the number of the one or more links.

In other embodiments, the method may further comprise: calculating the pagerank value of the each identity information pair further based on the weights of the other identity information pairs connected with the each identity information pair by the one or more links.

In still other embodiments, in response to that the searching result satisfies a risk condition, determining that the user to be recognized has a risk may comprise: in response to that the identity information pair to be recognized is found in the data of address books and has a weight lower than a threshold, determining that the user to be recognized has a risk.

In yet other embodiments, in response to that the searching result satisfies a risk condition, determining that the user to be recognized has a risk may comprise: in response to that the identity information pair to be recognized is not found in the data of address books, determining that the user to be recognized has a risk.

In other embodiments, the method may further comprise: correcting inconsistency among identity information pairs in different address books.

According to another aspect, the identity recognition device may comprise: one or more processors and one or more non-transitory computer-readable memories coupled to the one or more processors and configured with instructions executable by the one or more processors to cause the device to perform operations comprising: collecting data of address books, each address book comprising multiple identity information pairs of multiple users, and each identity information pair comprising a name and a mobile phone number; searching for an identity information pair to be recognized in the data of address books, the identity information pair to be recognized comprising a name and a mobile phone number of a user to be recognized; and in response to that the searching result satisfies a risk condition, determining that the user to be recognized has a risk.

According to still another aspect, provided is the non-transitory computer-readable storage medium storing instructions that, when executed by a processor, cause the processor to perform operations comprising: collecting data of address books, each address book comprising multiple identity information pairs of multiple users, and each identity information pair comprising a name and a mobile phone number; searching for an identity information pair to be recognized in the data of address books, the identity information pair to be recognized comprising a name and a mobile phone number of a user to be recognized; and in response to that the searching result satisfies a risk condition, determining that the user to be recognized has a risk.

The identity recognition method and device according to embodiments of the present disclosure establish an identity information database by collecting big data of address books, search for an identity information pair to be recognized in the identity information database, the identity information pair to be recognized including a name and a mobile phone number of a user to be recognized, and determine whether the identity information pair of the name and the mobile phone number is authentic, thereby determining whether the to-be-recognized user's identity is fraudulent and thus detecting identity fraud.

DETAILED DESCRIPTION

The embodiments of the present disclosure provide an identity recognition method used to recognize identity fraud. For example, swindlers assume other people's ID numbers and names, and use obtained mobile phone numbers for account registration and authentication on the Internet, committing fraudulence in credit applications such as credit card or loan applications. To recognize identity fraud even when swindlers bypass recognition models on a network device layer, the present disclosure provides a recognition scheme that determines whether a mobile phone number used by a user is the mobile phone number normally used by the user.

Based on the recognition scheme, after obtaining a sufficient amount of address books of users, an identity recognition entity which is to perform identity recognition on customers may obtain mobile phone numbers of all or nearly all potential customers to form an address book database. If subsequently a customer whose identity is to be verified is not in the address book database or has a very low weight when appearing in the database, then it is very likely that it is not the customer himself/herself that uses the identity, and the person using the customer's identity tends to be an imposter.

Figure 1:
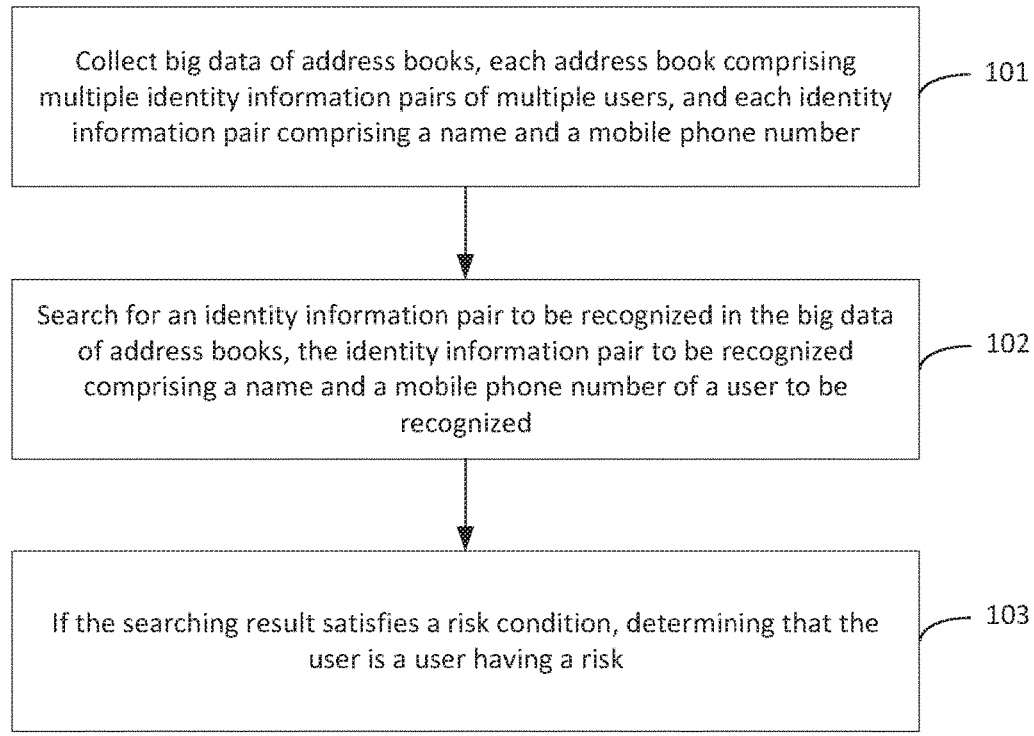
FIG. 1 is a flow chart of an example of an identity recognition method according to some embodiments of the present disclosure.

Referring to FIG. 1, an example of an identity recognition method according to some embodiments of the present disclosure is shown. The method can include the following steps.

Step 101, collecting big data of address books, each address book including multiple identity information pairs of multiple users, and each identity information pair comprising a name and a mobile phone number.

Figure 2:
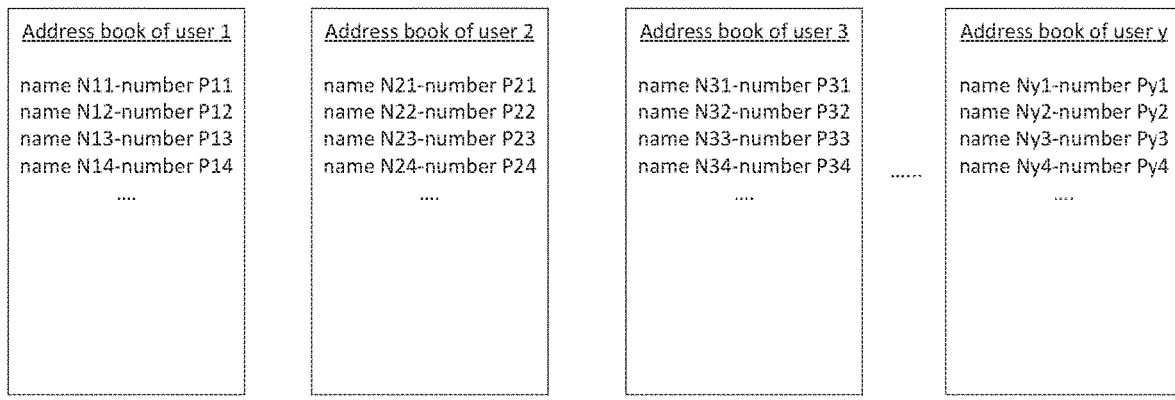
FIG. 2 is a schematic diagram of big data of address books of users according to some embodiments of the present disclosure.

For example, the big data of address books can include data of address books from many users. FIG. 2 illustrates big data of address books of users, e.g., user 1, user 2, user 3 until user y. The amount of address books is large enough to cover as many potential business customers as possible, so that the data of the address books can be used to perform identity verification on customers subsequently. Each address book may include multiple identity information pairs, and each identity information pair may include a name and a mobile phone number of a user. Taking the address book of user 1 as an example, "name N11-number P11" is an identity information pair indicating that the mobile phone number used by the person or entity represented by the name "N11" is "P11." Similarly, "name N12-number P12" is another identity information pair indicating that the mobile phone number used by the person or entity represented by the name "N12" is "P12."

In this Step 101, the data of address books can be collected through a variety of manners. For example, data of an address book on a user's mobile phone can be collected through client software running on the user's mobile phone.

Step 102, searching for an identity information pair to be recognized in the big data of address books, the identity information to be recognized including a name and a mobile phone number of a user to be recognized.

A searching result in this Step 102, for example, can include whether the big data of address books includes an identity information pair that is the same as the identity information pair to be recognized, or the number of the identity information pairs in the big data of address books that are the same as the identity information pair to be recognized, etc.

Step 103, if the searching result satisfies a risk condition, determining that the user is a user having a risk.

In some embodiments, the risk condition may be set as a variety of conditions. For example, the risk condition can be set that a user to be recognized is a user having a risk if the big data of address books does not have an identity information pair that is the same as the identity information pair to be recognized. Alternatively, the risk condition can be set that a user to be recognized has a risk if the big data of address books includes one or more identity information pairs same as the identity information pair to be recognized, but the number of the one or more identity information pairs same as the identity information pair to be recognized is small, e.g., smaller than a pre-determined threshold.

The identity recognition method in the present example establishes an identity information database by collecting big data of address books, search for an identity information pair to be recognized in the identity information database, the identity information pair to be recognized comprising a name and a mobile phone number of a user to be recognized, and determine whether the identity information pair of the name and the mobile phone number is authentic, thereby determining whether the to-be-recognized user's identity is fraudulent and thus detecting identity fraud.

Figure 3:
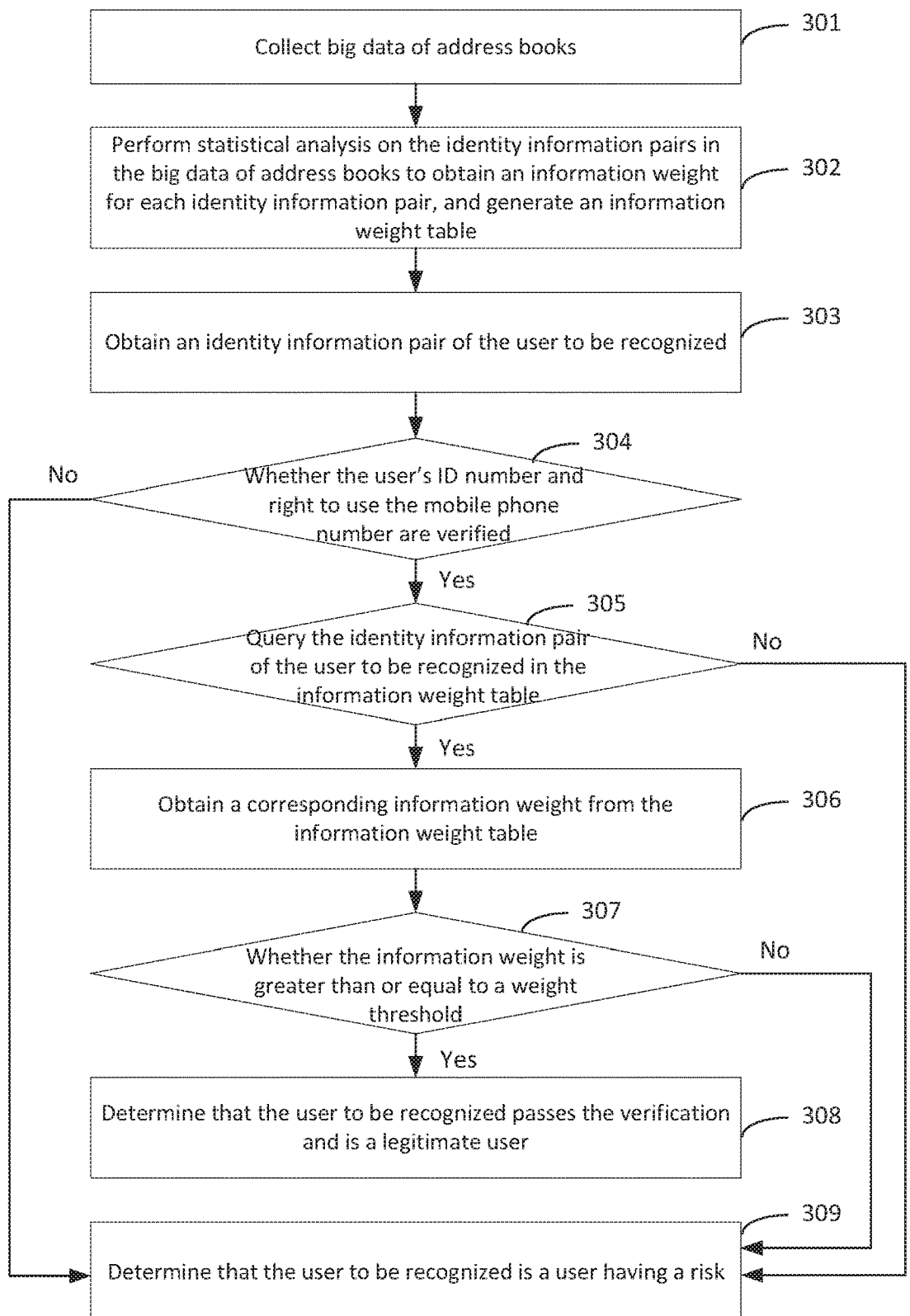
FIG. 3 is a flow chart of another example of the identity recognition method according to some embodiments of the present disclosure.

Referring to FIG. 3, another example of the identity recognition method is shown. The method shown in FIG. 3 constructs an information weight table according to the big data of address books. The information weight table can be used for verifying identities of users. As shown in FIG. 3, the method can include the following steps.

Step 301, collecting big data of address books. Step 302, performing statistical analysis on the identity information pairs in the big data of address books to obtain an information weight for each identity information pair, and generating an information weight table.

The information weight in this Step 301 can be used to indicate a degree of credibility of a corresponding identity information pair. For example, if an identity information pair of "name N11-number P11" appears in many users' address books, then it is very likely that the information of the identity information pair is authentic and acknowledged by many users; otherwise, it may indicate that the identity information pair has a low degree of credibility and the information may be falsified.

The information weights can be calculated according to different methods. Differences among the weights for different identity information pairs can be reflected by different statistics or relationships among the identity information pairs in the address books.

For example, the number of address books that include an identity information pair can be counted and used as an information weight of the identity information pair. Assuming that the identity information pair of "name N11-number P11" appears in five address books of users (such as five users, each user has an address book), then the corresponding information weight can be five. Assuming that the identity information pair of "name N12-number P12" appears in eight address books, then the corresponding information weight can be eight.

In another example, a pagerank value of each identity information pair can be calculated according to a pagerank method, and the pagerank value is used as an information weight of the identity information pair. In some embodiments, according to the pagerank method, a graph model (similar to a web graph model in PageRank) may be built by using the identity information pairs in the address books of users, and the information weight for each identity information pair may then be calculated based on the built graph model. When the graph model used by the pagerank method is being constructed, each identity information pair can be used as a node (equivalent to the page node in PageRank), and an outbound link of the page node points to another identity information pair in the address book of the user to which the identity information pair belongs. For example, the user to which the node of "name N11-number P11" belongs is a user having the name of "N11," the user's address book further includes the identity information pair of "name N12-number P12," and then an outbound link of the node of "name N11-number P11" points to the node of "name N12-number P12." An inbound link of a page node comes from identity information pairs of users in address books that include the identity information pair corresponding to the page node. Similar to the example above, the inbound link of the node of "name N12-number P12" is from the node of "name N11-number P11," because the address book of the user in the node of "name N11-number P11" includes the pair of "name N12-number P12."

After the graph model is built, the pagerank method can be used to calculate a pagerank value of each identity information pair (i.e., node), and the pagerank value is used as an information weight of the identity information pair. For example, the pagerank value (i.e., the information weight) of each identity information pair (i.e., node) may be calculated based on the number of inbound links, outbound links, or a combination of inbound and outbound links connecting to the each node.

In a web graph model in PageRank, the more inbound links from other webpages a page node receives, the more important this page is. In the embodiments of the present disclosure, if an identity information pair is included in more address books, the identity information pair is more credible. Therefore, the pagerank value (i.e., the weight) of an identity information pair may be determined based on the number of address books including the identity information pair, or the number of inbound and/or outbound links from and/or to other identity information pairs in the address books.

Further, in a web graph model in PageRank, different pages have different qualities. A high quality page transfers a heavier weight to other pages via the links pointing to the other pages. Therefore, when pages with higher quality point to another page, the other page is more important. Accordingly, the pagerank value of a target identity information pair may be determined further based on the weights of the identity information pairs pointing to the target identity information pair. In the some embodiments, the impact of the user to which the address book having the identity information pair belongs may be considered. When the identity information pair appears in the address book of a well-known public figure, the degree of credibility of the information in the identity information pair may be different from its degree of credibility when the identity information pair appears in the address book of an unknown ordinary person.

An information weight table shown in Table 1 below can be generated after the calculation in this Step 302. As shown in Table 1, the generated information weight table includes identity information pairs and their information weights. In other embodiments, the identity information pairs and their information weights may be stored in a data structure other than a table.

TABLE 1

| Information weight table Identity information pairs | | |
|---|---|---|
| Name | Number | Information weight |
| N11 | P11 | t1 |
| N12 | P12 | t2 |
| ... | ... | ... |

In addition, there may be nonstandard records in the identity information pairs in an address book. For example, a user's real name is "Wang, Xiaoyue" e.g., "王晓月" in Chinese. But when recording the user's name and mobile phone number, a friend of the user accidentally enters "王小月" [English translation: Wang, Xiaoyue] i.e., "小" [English translation: Xiao] is a typo. In some embodiments, inconsistency correction processing can be performed to correct the inconsistency that occurs when different users enter an originally identical identity information pair differently in their address books. For example, before the calculation of information weights for the identity information pairs in the big data of address books, the pairs of "王晓月 [English translation: Wang, Xiaoyue]-number H" and "王小月 [English translation: Wang, Xiaoyue]-number H" may both be treated as the same pair of "wangxiaoyue-number H," and recorded into the information weight table. That is, the inconsistent Chinese names "王小月" [English translation: Wang, Xiaoyue] and "王晓月" [English translation: Wang, Xiaoyue] are treated as the same name in pinyin, and the information weight corresponding to the identity information pair of "wangxiaoyue-number H" can be 2 (because, for example, "wangxiaoyue-number H" appears twice in the data of address books). When an identity information pair to be recognized is subsequently compared with the information weight table, a matching phone number, e.g., "H," is first found according to the number in the identity information pair to be recognized, and then the name in the pair is converted to pinyin to check if there is a matching name in pinyin. This way, the calculation of information weights can become more accurate. In some embodiments, the inconsistency correction processing may be applied to other types of errors according to actual business situations.

In the above example, where the pinyin of the names is the same, the Chinese characters of the names are different and the phone numbers are the same, a pinyin character string can be recorded in the information weight table to correct the inconsistency. In other embodiments, Chinese characters can be used to record the names in the information weight table. To recognize an identity information pair, a matching number may be found in the information weight table first according to the number in the pair. Subsequently, it may be determined whether a matching name in Chinese character can be found, and if there is no matching name in Chinese character, the name is converted to pinyin to check if there is a matching name in pinyin. When both the name and the number in the pair are matched, a matching identity information pair is found and a corresponding information weight can be obtained.

In still other embodiments, when searching for a matching identity information pair, inconsistency within a range may be allowed. For example, an identity information pair of "xiaoyue-number H" is recorded in the information weight table, i.e., the last name is missing, and the identity information pair to be recognized is "王晓月 [English translation: Wang, Xiaoyue]-number H." It may be found that the numbers in these two identity information pairs are both "H," and can be matched. Further, in the name field, "xiaoyue" is very similar to the pinyin of "王晓月" [English translation: Wang, Xiaoyue], i.e., "wangxiaoyue". For example, according to an algorithm, the similarity between the names is calculated and reaches above a similarity threshold, e.g., 70%. Then it may be determined that "xiaoyue" matches "王晓月" [English translation: Wang, Xiaoyue]. In other embodiments, other values of the similarity threshold can be set and used. When the similarity between two records is higher than the threshold, the two are regarded as matching each other even though they are not identical. Otherwise, the records may not be regarded as matching. For example, with regard to "xiaoyue" and "Wang, Jiahui (王家惠)" [English translation: Wang, Jiahui] the two names are substantially different and the similarity between them is lower than the threshold, and thus they are determined to be not matching.

The information weight table may be used in the following steps for identity information recognition. An identity information pair to be recognized can be compared with the pre-generated information weight table to obtain an information comparison result. The identity information pair to be recognized includes a name and a mobile phone number of a user to be recognized. If the information comparison result satisfies a risk condition, it is determined that the user is a user having a risk.

Step 303, obtaining an identity information pair of the user to be recognized.

For example, when a user is registering, identity information of the user can be obtained to recognize whether the user is a defrauder who assumes another person's identity. The identity information may include an ID number, a name, a mobile phone number, an address, and other contact information, where the name and mobile phone number can be referred to as an identity information pair.

Step 304, verifying the user's ID number and right to use the mobile phone number.

In this Step 304, the ID number and name can be verified through the public security network based on real names. Alternatively, a facial comparison can be performed between the user's face and the photo on the public security network associated with the ID. In addition, the verification can be performed in other forms. Furthermore, the user's mobile phone number can be verified to ensure that the user owns the right to use the mobile phone number at present.

If the verification is passed in this Step 304, the method proceeds to Step 305; otherwise, the method proceeds to Step 309.

Step 305, querying the identity information pair of the user to be recognized from the information weight table.

If the identity information pair can be found in the information weight table, the method proceeds to Step 306; otherwise, if the information weight table does not include the identity information pair, the method proceeds to Step 309.

Step 306, obtaining a corresponding information weight from the information weight table.

For example, an information weight corresponding to the identity information pair found in Step 303 can be obtained from the pre-generated information weight table.

Step 307, determining whether the information weight is greater than or equal to a weight threshold.

In some embodiments, the weight threshold, e.g., t0, can be set according to factors such as the coverage of all potential customers by the amount of big data collected for generating the information weight table, the strictness of the control of identity fraud risk by the entity using this identity recognition method, and the like. For example, assuming that the entity strictly controls users' identities, the weight threshold may be set at a large value to ensure high information authenticity and reliability. In another example, if the amount of the collected big data has a low coverage of all potential customers, the weight threshold may be set at a large value to improve the information authenticity and reliability.

If it is determined in this Step 307 that the information weight is greater than or equal to a weight threshold, the method proceeds to Step 308; otherwise, the method proceeds to Step 309.

Step 308, determining that the user to be recognized passes the verification and is a legitimate user.

Step 309, determining that the user to be recognized is a user having a risk.

After the user is determined to be a user having a risk, the fraud operation of the user can be found accordingly.

The identity recognition method in the present example creates an information weight table according to big data of address books, determines credibility of each identity information pair, and can determine, based on a weight threshold, whether an identity information pair of a name and a mobile phone number of a user to be recognized is authentic, thereby determining whether the to-be-recognized user's identity is fraudulent and thus detecting identity fraud.

Figure 4:
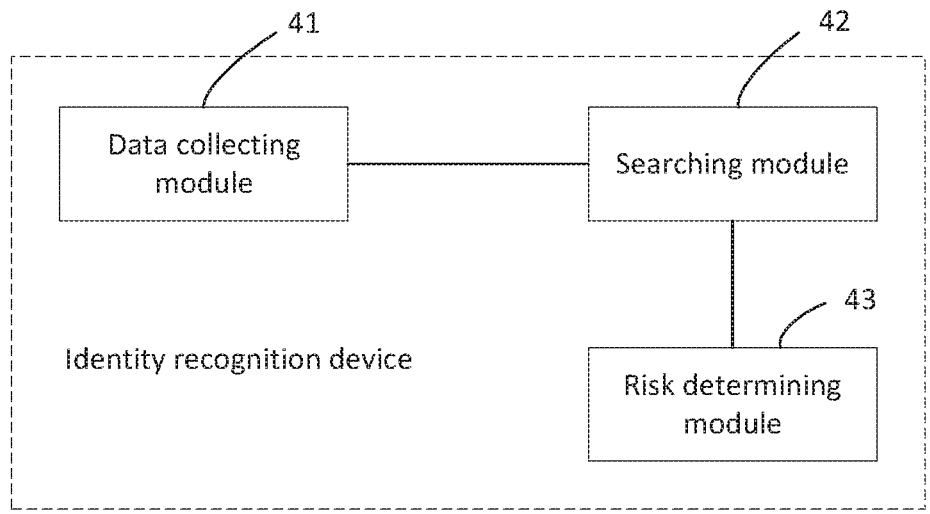
FIG. 4 is a schematic structural diagram of an example of an identity recognition device according to some embodiments of the present disclosure.

In some embodiments, an identity recognition device is provided, as shown in FIG. 4. The device can include: a data collecting module 41, an information comparing module 42, and a risk determining module 43.

The data collecting module 41 is configured to collect big data of address books from multiple users, each address book including multiple identity information pairs, and each identity information pair comprising a name and a mobile phone number.

The searching module 42 is configured to search an identity information pair to be recognized in the big data of address books, the identity information pair to be recognized including a name and a mobile phone number of a user to be recognized.

The risk determining module 43 is configured to determine that the user to be recognized is a user having a risk in response to that the searching result satisfies a risk condition.

Figure 5:
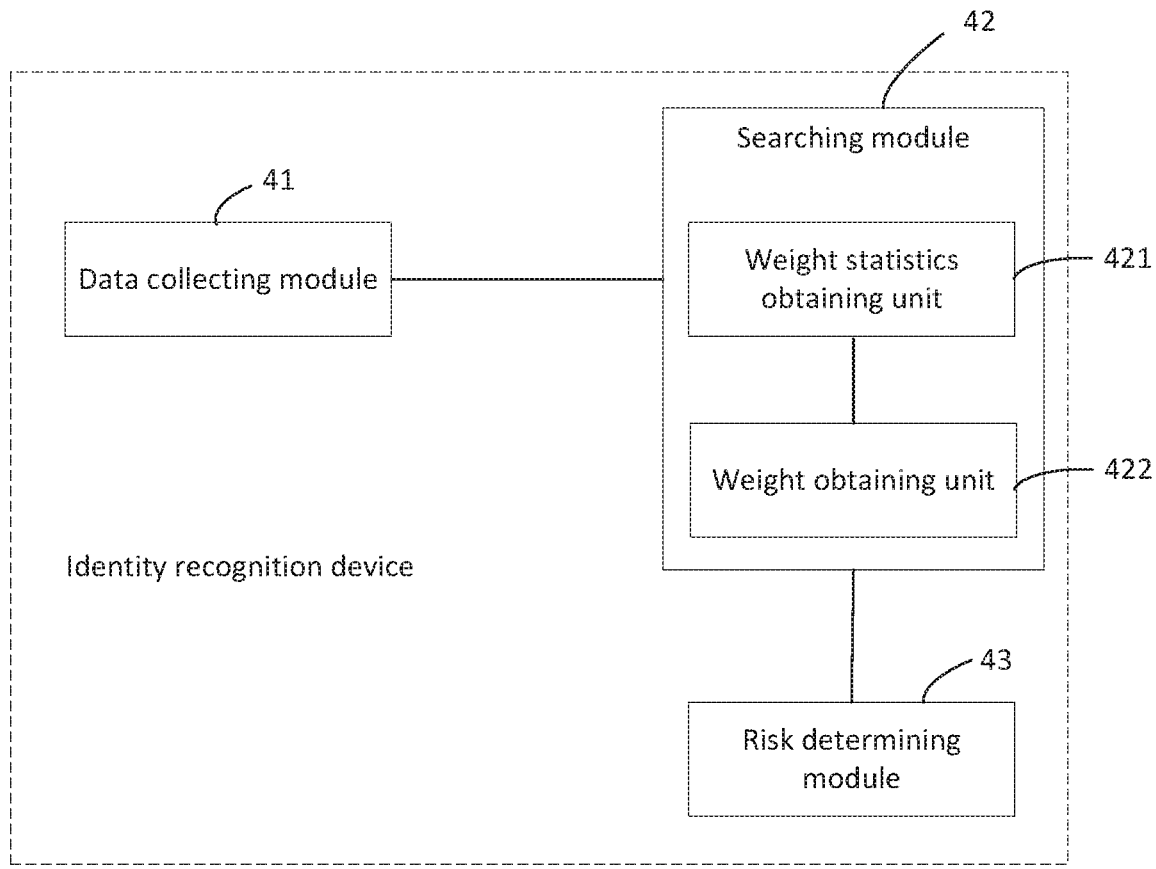
FIG. 5 is a schematic structural diagram of another example of the identity recognition device according to some embodiments of the present disclosure.

In some embodiments, as shown in FIG. 5, the searching module 42 in the device can include: a weight statistics obtaining unit 421 configured to perform statistical analysis on the identity information pairs in the big data of address books to obtain an information weight corresponding to each identity information pair, the information weight being used to indicate a degree of credibility of the identity information pair; and a weight obtaining unit 422 configured to obtain an information weight corresponding to the identity information pair to be recognized based on the analysis.

The risk determining module 43 is configured to, for example, if the analysis result does not have an information weight corresponding to the identity information pair to be recognized, or if the information weight corresponding to the identity information pair to be recognized is lower than a preset weight threshold, determine that the user to be recognized is a user having a risk.

The weight statistics obtaining unit 421 is configured to, for example, use the number of address books including the identity information pair as an information weight of the identity information pair; alternatively, calculate a pagerank value of each identity information pair using a pagerank method, and use the pagerank value as an information weight of the identity information pair.

In another example, the weight statistics obtaining unit 421 is further configured to correct inconsistency among identity information pairs in different address books before analyzing the identity information pairs in the big data of address books.

The identity recognition device creates an information weight table according to big data of address books, determines credibility of each identity information pair, and can determine, based on a weight threshold, whether an identity information pair of a name and a mobile phone number of a user to be recognized is authentic, thereby determining whether the to-be-recognized user's identity is fraudulent and thus detecting identity fraud.

Embodiments are described above, which are not used to limit the present disclosure. Any modification, equivalent substitution or improvement made within the spirit and principle of the present disclosure shall be encompassed by the protection scope of the present disclosure.

What is claimed is:

1. An identity recognition method, comprising:
collecting data of a plurality of address books, each address book comprising multiple identity information pairs of multiple users, and each identity information pair comprising a name and a mobile phone number;
correcting inconsistencies among identity information pairs having a same mobile phone number and a different name in different address books;
after correcting the inconsistencies, performing statistical analysis on the identity information pairs in the data of address books to obtain an information weight corresponding to each identity information pair by calculating a pagerank value of each identity information pair using a pagerank method, and using the pagerank value as an information weight of the identity information pair, wherein calculating the pagerank value of each identity information pair comprises determining a number of outbound links of each identity information pair, wherein each outbound link of an identity information pair represents another identity information pair in the address book of a user to which the identity information pair belongs, the information weight indicating a degree of credibility of the identity information pair;
searching for an identity information pair to be recognized in the data of address books, the identity information pair to be recognized comprising the name and the mobile phone number of a user to be recognized;
in response to finding the identity information pair to be recognized in the data of the address books, obtaining the information weight corresponding to the identity information pair to be recognized; and
in response to the information weight corresponding to the identity information pair to be recognized being lower than a threshold, determining that an identity of the user to be recognized is fraudulent.

2. The method according to claim 1, further comprising:
calculating the pagerank value of each identity information pair further based on the weights of the other identity information pairs connected with the each identity information pair by the one or more outbound links.

3. A system comprising one or more processors and one or more non-transitory computer-readable memories coupled to the one or more processors and configured with instructions executable by the one or more processors to cause the one or more processors to perform operations comprising:
collecting data of a plurality of address books, each address book comprising multiple identity information pairs of multiple users, and each identity information pair comprising a name and a mobile phone number;
correcting inconsistencies among identity information pairs having a same mobile phone number and a different name in different address books;
after correcting the inconsistencies, performing statistical analysis on the identity information pairs in the big data of address books to obtain an information weight corresponding to each identity information pair by calculating a pagerank value of each identity information pair using a pagerank method, and using the pagerank value as the information weight of the identity information pair, wherein calculating the pagerank value of each identity information pair comprises determining a number of outbound links of each identity information pair, wherein each outbound link of an identity information pair represents another identity information pair in the address book of a user to which the identity information pair belongs, the information weight indicating a degree of credibility of the identity information pair;
searching for an identity information pair to be recognized in the data of address books, the identity information pair to be recognized comprising the name and the mobile phone number of a user to be recognized;
in response to finding the identity information pair to be recognized is found in the data of the address books, obtaining the information weight corresponding to the identity information pair to be recognized; and
in response to the information weight corresponding to the identity information pair to be recognized being lower than a threshold, determining that an identity of the user to be recognized is fraudulent.

4. The system according to claim 3, wherein the operations further comprise:
calculating the pagerank value of each identity information pair further based on the weights of the other identity information pairs connected with the each identity information pair by the one or more outbound links.

5. A non-transitory computer-readable storage medium storing instructions that, when executed by a processor, cause the processor to perform operations comprising:
   collecting data of a plurality of address books, each address book comprising multiple identity information pairs of multiple users, and each identity information pair comprising a name and a mobile phone number;
   correcting inconsistencies among identity information pairs having a same mobile phone number and a different name in different address books;
   after correcting the inconsistencies, performing statistical analysis on the identity information pairs in the big data of address books to obtain an information weight corresponding to each identity information pair by:
   calculating a pagerank value of each identity information pair using a pagerank method, and using the pagerank value as the information weight of the identity information pair, wherein calculating a pagerank value of an identity information pair comprises determining a number of outbound links of each identity information pair, wherein each outbound link of an identity information pair represents another identity information pair in the address book of a user to which the identity information pair belongs, the information weight indicating a degree of credibility of the identity information pair;
   searching for an identity information pair to be recognized in the data of address books, the identity information pair to be recognized comprising the name and the mobile phone number of a user to be recognized;
   in response to that the identity information pair to be recognized is found in the data of address books, obtaining the information weight corresponding to the identity information pair to be recognized; and
   in response to that the information weight corresponding to the identity information pair to be recognized is lower than a threshold, determining that an identity of the user to be recognized is fraudulent.

6. The non-transitory computer-readable storage medium according to claim 5, the operations further comprising:
   calculating the pagerank value of each identity information pair further based on the weights of the other identity information pairs connected with the each identity information pair by the one or more outbound links.

* * * * *